United States Patent [19]

Shanbhag et al.

[11] Patent Number: 4,931,298
[45] Date of Patent: Jun. 5, 1990

[54] PROCESS FOR PREPARING POTATO GRANULE COATED FRENCH FRIED POTATOES

[75] Inventors: Sudhakar Shanbhag, Pound Ridge, N.Y.; Joseph J. Cousiminer, Mercerville, N.J.

[73] Assignee: Horizons International Foods, Inc., Burlington, Mass.

[21] Appl. No.: 248,454

[22] Filed: Sep. 23, 1988

Related U.S. Application Data

[63] Continuation-in-part of Ser. No. 193,370, May 12, 1988, abandoned.

[51] Int. Cl.$^5$ .............................................. A23L 1/217
[52] U.S. Cl. ................................... 426/296; 426/441; 426/524; 426/637
[58] Field of Search ............... 426/537, 438, 296, 524, 426/441; 62/62, 63, 64

[56] References Cited

U.S. PATENT DOCUMENTS

| | | |
|---|---|---|
| Re. 27,531 | 12/1972 | Murray et al. |
| 2,855,308 | 10/1958 | Buechele et al. ............ 426/438 |
| 2,906,620 | 9/1959 | Jung |
| 3,050,404 | 8/1962 | Traisman |
| 3,175,914 | 3/1965 | Vahlsing, Jr. |
| 3,359,123 | 12/1967 | Katucki et al. .............. 426/524 X |
| 3,368,363 | 2/1968 | Alaburda et al. ........... 426/524 X |
| 3,397,993 | 8/1968 | Strong |
| 3,404,989 | 10/1968 | Hirtensteiner ............... 426/524 X |
| 3,424,591 | 1/1969 | Gold |
| 3,532,509 | 10/1970 | Gronberg |
| 3,574,638 | 4/1971 | Nagel et al. |
| 3,594,188 | 7/1971 | Huxsoll et al. |
| 3,597,227 | 8/1971 | Murray et al. |
| 3,649,305 | 3/1972 | Wilder |
| 3,729,323 | 4/1973 | Nonaka et al. |
| 3,751,268 | 8/1973 | van Patten et al. |
| 3,796,804 | 3/1974 | Ballentine .................... 426/524 |
| 3,865,964 | 2/1975 | Kellermeier et al. ........ 426/307 |
| 3,881,028 | 4/1975 | Capossela et al. .......... 426/242 |
| 4,109,020 | 8/1978 | Gorfien et al. .............. 426/241 |
| 4,219,575 | 8/1980 | Saunders et al. ........... 426/242 |
| 4,254,153 | 3/1981 | Ross et al. .................. 426/441 |
| 4,269,861 | 5/1981 | Caridis et al. .............. 426/438 |
| 4,272,553 | 6/1981 | Bengtsson et al. .......... 426/241 |
| 4,283,425 | 8/1981 | Yuan et al. .................. 426/102 |
| 4,297,377 | 10/1981 | Harney et al. .............. 426/438 |
| 4,317,842 | 2/1982 | El-Hag et al. ............... 426/302 |
| 4,385,075 | 5/1983 | Brooks ........................ 426/524 |
| 4,447,459 | 5/1984 | Balboni et al. .............. 426/441 |
| 4,456,624 | 6/1984 | Glantz et al. ................ 426/96 |
| 4,511,583 | 4/1985 | Olson et al. ................. 426/89 |
| 4,518,618 | 5/1985 | Hsia et al. ................... 426/262 |
| 4,529,607 | 7/1985 | Lenchin et al. .............. 426/94 |
| 4,551,340 | 11/1985 | El-Hag et al. ............... 426/437 |
| 4,559,232 | 12/1985 | Glantz et al. ................ 426/96 |
| 4,579,743 | 4/1986 | Hullah ......................... 426/524 X |
| 4,590,080 | 5/1986 | Pinegar ....................... 426/441 |
| 4,632,838 | 12/1986 | Doenges ...................... 426/441 |
| 4,640,837 | 2/1987 | Coleman et al. ............. 426/94 |
| 4,751,093 | 6/1988 | Hong et al. .................. 426/438 |
| 4,761,294 | 8/1988 | Hamann et al. ............. 426/438 |

FOREIGN PATENT DOCUMENTS

| | | | |
|---|---|---|---|
| 900266 | 5/1972 | Canada ........................ 426/438 |
| 2078081 | 1/1982 | United Kingdom .......... 426/438 |

*Primary Examiner*—Arthur L. Corbin
*Attorney, Agent, or Firm*—Kenyon & Kenyon

[57] ABSTRACT

A process for producing highly palatable french fried potatoes which are prepared for serving by a short reheating period in a conventional deep fat fryer is disclosed. The potato strips closely simulate the color, texture, aroma, flavor, mouthfeel and total eating experience of state of the art french fries prepared for serving in fast food restaurants by deep fat frying. The process includes dust-coating blanched potato strips with granules derived from potato products, and thereafter finish frying the dust-coated potato strips in fat or oil until the moisture content of the potato strips is from about 34 to about 42 percent by weight. Thereafter, the potato strips are reheated by frying in a conventional deep fat fryer for a relatively short period of time, i.e., about 20 seconds. The finish fried potato strips have from about 30 to about 37 percent by weight moisture content.

43 Claims, No Drawings

PROCESS FOR PREPARING POTATO GRANULE COATED FRENCH FRIED POTATOES

This is a continuation-in-part application of Ser. No. 193,370, filed May 12, 1988, now abandoned.

FIELD OF THE INVENTION

The present invention relates to a process for producing a french fried potato product which upon a short reheating in a deep fat fryer closely resembles the size, shape, appearance, color, texture, taste, aroma, and total eating experience of conventional deep fat french fried potato products.

BACKGROUND OF THE INVENTION

The market for french fried potato strips, commonly referred to as french fries, is currently estimated at approximately 6.5-7 billion dollars annually. The bulk of this market is the fast-food restaurant business, wherein parfried and frozen potato strips are commonly purchased in bulk from commercial suppliers and stored at freezer temperatures until shortly before serving. At that point, the parfried and frozen potato strips are prepared for eating by deep fat frying in fat or oil.

McDonald's TM french fries, long considered the state of the art in the fast-food industry, apparently are processed according to the process disclosed in U.S. Pat. No. 3,397,993 (Strong). Therein, raw potato strips are blanched by steam or hot water until generally translucent throughout, dehydrated in hot air to cause a weight loss of at least 20 percent, parfried for 30-60 seconds at 375° F. and then frozen to about 0° F. The frozen potato strips are shipped and/or stored until final frying is desired. They are finish fried by immersing in a deep fat or oil bath, usually containing a medium consisting mainly of beef tallow, at a temperature of about 300°-375° F. for 1.5-3.5 minutes.

Another method for preparing french fries for fast food restaurants is taught in U.S. Pat. No. 3,649,305 (Wilder), wherein potato strips are dehydrated to reduce their moisture content by 10-30 percent, blanched, parfried for 30-90 seconds at about 300°-400° F. and then frozen. The frozen strips are then fried in oil for 1.5-3 minutes at 325°-375° F.

Many attempts have been made to duplicate for home use the flavor, aroma, color, texture and total eating experience of deep fat fried french fries prepared according to the above or similar methods. These efforts have met with varied results. The processes used in the prior art are pan-frying in oil or oven baking. To date, all of these prior art methods suffer from one or more deficiencies. For example, they produce limp, soggy, greasy, or dehydrated products which do not approximate the total eating experience of fast-food french fried potatoes. Examples of these prior art methods include those disclosed in U.S. Pat. No. 3,597,227, U.S. Pat. No. Re. 27,531 (Murray et al.), U.S. Pat. No. 3,865,964 (Kellermeier et al.), U.S. Pat. No. 3,751,268 (Van Patten et al.), U.S. Pat. No. 4,317,842 (El-Hag et al.), U.S. Pat. No. 4,551,340 (El-Hag et al.), U.S. Pat. No. 4,109,020 (Gorfien et al.), U.S. Pat. Nos. 4,456,624 and 4,559,232 (both to Glantz et al.), U.S. Pat. No. 4,632,838 (Doenges), U.S. Pat. No. 4,590,080 (Pinegar), U.S. Pat. No. 4,219,575 (Saunders et al.) and U.S. Pat. No. 4,272,553 (Bengtsson et al.).

U.S. Pat. No. 4,317,842 (El-Hag et al.), for instance, discloses a process for producing french fried potatoes which upon oven baking is intended to simulate deep fat fried potato strips. Raw potatoes are peeled, cut, parfried for 30-60 seconds at 375° F. and then frozen. Thereafter, the parfried and frozen potato strips are coated with a 4 percent potato starch solution, soaked in an oil bath at a temperature of from 120°-210° F. for 2-6 minutes, and thereafter par-fried at 325°-400° F. for 10-250 seconds. The potato strips are then frozen and later oven baked, preferably using a special conductive heat transferring apparatus.

Another reference, U.S. Pat. No. 3,865,964 (Kellermeier) discloses a process for producing an oven baked french fried product by spraying edible oil or fat onto frozen potato strips, freezing the potato strips, and then baking the potato strips in an oven.

Methods such as those outlined above are deficient in that they require a special apparatus for final preparation, or require a significant time period (i.e., oven warming and baking) before the frozen product is ready to serve. In addition, the potato strips which are baked in an oven are exposed to significantly greater temperatures on their exterior than in their interior. Moreover, regardless of the oven temperature, the bottom of the potato strips which sit on the cooking pan, etc. are exposed to much greater temperatures due to conductive heating than the upper surface, which is heated mainly by convection. This causes the bottom surface to burn while the upper surface remains relatively moist. It has been difficult if not impossible to recreate the total eating experience obtained from deep-fat frying in the conventional oven found in most homes. Thus, these techniques are of limited value.

More recently, attention has been directed to the use of microwave ovens for preparing frozen french fries. In a microwave oven, high frequency energy is passed through the food product. The power absorption or specific absorption rate for a particular product depends upon a variety of physical and chemical factors, such as frequency, product temperature, the magnitude of the electric field in the product, density and dielectric constants. The high frequency energy excites polar molecules (such as water) contained within the food product and heat is generated as a result.

Various references disclose methods for preparing french fried potato products which can be cooked in microwave ovens.

U.S. Pat. No. 4,456,624 (Glantz et al.) discloses embedding potato pieces in potato strips by high energy impingement which disrupts the surface which has been preheated in water. Thereafter, the strips are blanched and parfried for 5-20 seconds at 340°-380° F. After freezing, the potato strips are by either fried or oven baked to complete the process. The patent also states that the potato strips also may be finally cooked in a microwave oven, although no examples are provided.

U.S. Pat. No. 4,590,080 (Pinegar) discloses subjecting potato strips to blanching, parfrying for 50-100 seconds at 360° F., intermediate freezing at −40° F. for 10 minutes, a longer parfrying for 2-4 minutes at 360° F., blast freezing, storing and microwaving. The microwaving of a 3 ounce quantity of french fried potato strips is stated therein as requiring a 650 watt power setting for 1.5-2 minutes.

U.S. Pat. No. 4,109,020 (Gorfien et al.) discloses partially dehydrating frozen parfried potato strips by heating in an air oven or by heating in a combination microwave/air oven and then additionally heating in an air oven, frying in a deep fat fryer for 1 to 3 minutes at 375° F., freezing at −10° F. for 4 hours, storing and microwaving. The microwaving is at 650 watts for 135-180 seconds.

Finally, U.S. Pat. No. 4,219,575 (Saunders et al.) discloses a complex sinusoidal strip surface configuration for crinkle cut potatoes which are subjected to frying for 4 minutes at 350° F., and thereafter blast frozen to an internal temperature of 0° F. A two ounce sample exhibited increased crispness when heated in a microwave oven for one minute at 1000 watts.

Due to the large amount of water present in these prior art microwaveable potato strips, they are actually being cooked in the microwave oven rather than reheated. The heating caused by the action of microwave energy upon the aforementioned amounts of water within the potato strip often causes structural damage in the form of collapsed areas. Additionally, during microwaving, the moisture in the food piece is driven outward, which can cause the exterior to become soggy.

It is therefore an object of the present invention to provide a french fried product which when reheated in a conventional microwave oven, closely resembles the flavor, aroma, texture, mouthfeel and total eating experience of a deep-fat fried fast food french fry.

It is another object of the present invention to produce a product which utilizes the particular manner in which a microwave oven heats food products in order to provide a highly palatable french fried product which has a crisp exterior and a tender interior.

It is a further object of the present invention to provide a microwaveable french fried product which does not become soggy or limp upon heating and which does not suffer from the structural collapse present in prior art microwaved products.

It is yet another object of the present invention to provide a microwaved french fried potato product which can be reconstituted in a convenience store or in the consumer's home in a very short period of time, i.e., about one minute or less for an ordinary serving, and which is virtually indistinguishable from deep-fat fried french fried potatoes which may be purchased in fast-food restaurants.

It is yet another object of the present invention to provide a french fried potato product which can be reconstituted in a deep fat fryer in a very short period of time in comparison to prior art procedures, and which is virtually indistinguishable from deep fat french fried potatoes which may be purchased in fast-food restaurants.

SUMMARY OF THE INVENTION

One aspect of the present invention is based in part on the recognition that the relative proportions of the components of the potato strip, which are to be reheated in a microwave oven, especially with regard to moisture and fat content, are crucial to the development of a highly palatable reheated french fried potato product. These proportions are different from those taught in the prior art.

In accordance with the above-mentioned objectives, one embodiment of the present invention relates to a process for preparing improved french fried potatoes which are suitable for subsequent reheating in a microwave oven which comprises, preferably, dust-coating potato strips with a layer of potato granules and thereafter finish frying the dust-coated potato strips until the potato strips have a moisture content from about 20 to about 36 percent by weight, a fat content of from about 16 to about 30 percent, and a potato solids content of from about 34 to about 64 percent, by weight of the potato strip. In preferred embodiments, the finish fried potato strip have a moisture content from about 26 to about 31 percent, a fat content from about 22 to about 27 percent and a potato solids content from about 42 to about 52 percent by weight of the potato strip. The density of the finished fried potato product is from about 0.4 to about 0.6 g/ml, and preferably from about 0.43 to about 0.49 g/ml. The potato strips can be prepared from raw potatoes or from potatoes which have previously been parfried, or parfried and frozen. The finish fried potato strips may either be stored or refrigerated and reheated in a microwave oven or frozen and stored at freezer temperatures for later reheating in a microwave oven. The microwaved potato strips are exposed to an effective amount of microwave energy. The microwaved potato strips are a golden brown color and have a crisp exterior and a fluffy, light (tender) interior. The finished potato product has a color, texture, mouthfeel and taste which closely resembles commercially prepared french fried potatoes which have been prepared by deep-fat frying, such as McDonald's ™ french fries. The product made by any conventional technique may be improved by the addition of a dusting step prior to final frying.

In a preferred embodiment of the present invention the potato strips which are to be dust-coated have been previously parfried, and usually parfried and frozen.

The present invention also relates to finish fried potato strips suitable for reheating in a microwave oven and which are bitextural upon microwave reheating, with a relatively crisp exterior portion comprising potato granules and an interior portion which is tender. The composition of the microwave reheated product is substantially the same as the finish fried and frozen potato strips.

The present invention also relates to a microwave reheated french fried product which is bitextural and has a coating of potato granules which provide a relatively crisp texture to the exterior portion of the potato strip and a fluffy, light interior. The composition of the microwave reheated french fried product is substantially the same as the finish fried and frozen potato strips. Accordingly, the product has a total moisture content of from about 20 to about 36 percent, a fat content of from about 16 to about 30 percent, and a potato solids content of from about 34 to about 64 percent by weight of the potato strip. In preferred embodiments, the moisture content of the microwave reheated french fried product is from about 24 to about 29 percent, the fat content is from about 20 to about 24 percent, and the potato solids content is from about 47 to about 56 percent, by weight of the microwaved potato strips. The density of the microwave reheated french fried product is from about 0.4 to about 0.6 g/ml, and preferably from about 0.43 to 0.49 g/ml.

The present invention also relates to a french fried product which is subjected to a short reheating by deep fat frying. By "short reheating" it is meant that the french fried product is reheated for less than about one minute, and preferably less than 30 seconds. The reheated product is bitextural and has a relatively crisp exterior texture and a fluffy, light interior. Preferably, the french fried product includes a coating of potato granules. The preferred composition of the finish fried and frozen potato strips and deep fat fried product includes a slightly higher moisture content than that which is used when the potato strips are to be reconstituted by microwave reheating to compensate for moisture loss during the final deep fat frying step.

Accordingly, the finish fried and frozen product which is to be reheated by deep fat frying has a moisture content from about 34 to about 42 percent, a fat content from about 15 to about 21 percent, and a potato solids content from about 37 to about 64 percent, by weight of the potato strip. Preferably, the finish fried potato strip has a moisture content from about 36 to about 38 percent, a fat content from about 16 to about 18 percent, and a potato solids content from about 44 to about 48 percent. The product reheated by deep fat frying has a moisture content from about 30 to about 37 percent, a fat content from about 18 to about 26 percent, and a potato solids content from about 37 to about 52 percent by weight of the potato strip. Preferably, the reheated product has a moisture content from about 32 to about 35 percent, a fat content from about 23 to about 25 percent, and a potato solids content from about 40 to about 45 percent. Other embodiments and discoveries are reported below.

DETAILED DESCRIPTION

The process of the present invention is practiced upon conventional potato strips first by the initial preparation of whole potatoes into strips which may be treated as discussed below. Basically, the whole potatoes are washed, peeled and then cut into strips having the desired size and shape. Thereafter, the potato strips are blanched. Blanching has a leaching effect on sugars present in the potato strips and serves to even out the sugar levels throughout the potato strips in order to prevent the production of dark or uneven colored finished fries, which is caused mainly by the action of enzymes which are inactivated in the blanching step. Commercial procedures for washing, peeling, cutting and blanching in the production of french fried potatoes are discussed in "Potato Processing" by William F. Talburt and Ora Smith, Third Edition, 1975, published by The AVI Publishing Company Inc., Westport, Conn. at pages 415-423. In particular, blanching is usually carried out by exposing the raw cut strips to either water or steam for a suitable time and temperature well known in the prior art.

The potato strips which are used in the present invention may be of varying size and shape. However, it is preferred that the relatively thin and elongated potato strips known in the art as "shoestrings" be used. Shoestring potato strips, as the term is used herein, is defined as potato strips which are from about 3/16 to about 5/16 inch square in cross-section and from about 2.5 to about 5 inches in length. Preferred is a shoestring potato strip of from about ¼ to about 5/16 inch (per side) square in cross-section and from about 2.5 to about 4.5 inches in length.

It is also within the scope of the present invention to use irregularly cut potato strips known in the art as "crinkle-cut" strips. Such strips usually average from about 5/16 to about 7/16 inch square in cross-section and from about 2 to about 3 inches in length. Also, straight cut thick fries of about ½ inch square in cross-section and about 2.5 to about 3.5 inches in length may be used.

It is preferred that the potato strips that are to be dust-coated are previously parfried, or parfried and frozen. Such potato strips are widely available in the food industry from various sources, and are made commercially available to fast food restaurants, distributors, etc.

An example of a preferred manner in which the potato strips may be processed prior to dust-coating is taught in U.S. Pat. No. 3,397,993 (Strong), assigned to McDonald's System Inc., and hereby incorporated by reference. Strong teaches that after the strips are washed free of starch by barrel washing, fluming, etc., they are then blanched preferably by steam for about 2-10 minutes until all portions of the strips receive enough heat to turn them into a generally translucent condition throughout. Alternatively, a hot water blanch may be used for about 3-8 minutes at a temperature of about 160°-200° F. The strips are then dehydrated by subjecting them to heated air currents to reduce their moisture content for about 5-20 minutes at a temperature of about 150°-350° F. Thereafter, the strips are parfried in a deep fat fryer for a short period of time, preferably from about 15 to about 60 seconds at a temperature of from about 300° to about 375° F. The parfrying has the effect of further reducing the moisture content and partially frying the raw potato strips. The term "parfrying" refers to the partial frying of a potato strip to a degree less than that of a finally cooked or "finish fried" potato strip.

In most instances, the oil used to accomplish the parfrying of the potato strips comprises refined beef tallow oleo stock or a blend of beef tallow and a lesser amount of one or more vegetable oils, i.e. usually 10-15 percent.

Finally, the strips are frozen, for instance by placing them directly into a freezer, by first cooling the strips and then freezing them to about 0° F., or by blast freezing them at a temperature of from about −25° to about −30° F. by the use of freon, etc. The frozen strips are then packaged as desired, stored and/or shipped for further processing.

Although the Strong disclosure is discussed above as an example of the manner in which the potato strips may be treated prior to dust-coating, it is not meant to be exclusive. Many other procedures well-known in the art are also suitable, such as that which is disclosed in U.S. Pat. No. 3,649,305 (Wilder), hereby incorporated by reference.

It is also important to note that other fats and oils in addition to or in the place of beef tallow may be used to parfry the potato strips. For instance, hydrogenated cottonseed oil, soybean, palm, safflower, coconut, peanut oils and the like, or combinations thereof can also be used. Additionally, it is envisioned that a calorie-less fat such as Olestra ™, from the Procter and Gamble Co., would also be useful in parfrying and/or finish frying.

The potato strips may be further pretreated prior to freezing according to conventional methods known in the art. For instance, the potato strips may be treated with sodium acid pyrophosphate (SAPP), a chelating agent used to prevent discoloration of the strips. Dextrose (corn sugar) may be used in order to provide a golden color upon frying. Sulfur dioxide may be used to inhibit browning. Other pretreatments known in the art may also be used.

The parfried and frozen potato strips generally have a moisture content of about 60-67 percent, a fat content of from about 4 to about 7 percent by weight, and a potato solids content of from about 30 to about 36 percent by weight of the potato strip.

In another embodiment of the present invention, raw unpeeled white potatoes are obtained for processing. Usually, raw white potatoes have a moisture content of about 75–85 percent by weight. Although any variety of potato would be useful to practice the present invention, Russet Burbank or Katahdin potatoes are preferred. The potatoes are washed, peeled, trimmed, sorted, cut, blanched, and optionally pretreated in any conventional manner or as detailed in the above-mentioned Potato Processing reference. Thereafter, the potato strips are dust-coated.

By a further teaching of the present invention, potato strips are prepared as disclosed in pending applications U.S. Ser. No. 017,140, filed Feb. 20, 1987, now abandoned, and continuation-in-part application U.S. Ser. No. 108,722, filed Oct. 14, 1987, and then treated in accordance with the present invention to render a superior engineered or artificial french fried potato product.

The dust-coating of the potato strips can be carried out in any conventionally known manner. For instance, the potato strips are placed onto a conveyor belt with vibration action and potato granules are sprinkled onto the potato strips from above. Thereafter the excess potato granules are removed via the vibratory action. A thin, even coating of potato granules is thereby accomplished.

The term "potato granules" is defined for purposes of the present invention as comprising any granular product which has been derived from potato products, such as finely ground potatoes, potato flour, dehydrated potato, potato flakes, potato starch, etc., or a mixture of any of the above. All of the above-mentioned granular products are available commercially from any number of sources. It is preferred that the dust-coating comprise at least 50 percent potato granules, and in the most preferred embodiments, the dust-coating is comprised only of potato granules and preferably finely ground potatoes.

The potato granules used for dust-coating should have a fine particle size which produces a coating indistinguishable from the surface appearance of a conventional french fried potato. The term "conventional french fried potato" is defined herein as a deep fat fried potato strip having a crisp, golden exterior and a tender interior, such as the McDonald's TM french fry. Due to the use of fine granules, it is possible to obtain a dust-coated product which is both smooth and which provides a uniform appearance. In this regard, a dust powder having 90–95% of its granules at U.S. 40 mesh and which includes no more than 8 percent moisture is preferred, such as that which is available from Basic American Foods Company. A cross-sectional view (perpendicular to the long axis of a shoestring potato strip, shows that the dust-coating blends imperceptively into the potato strip as part of a crisp layer formed during finish frying.

Any number of processes are known in the art for the preparation of potato granules which may be used satisfactorily in the present invention. One such process is the "add-back" process, in which cooked potatoes are partially dried by "adding back" enough previously dried granules to give a "moist mix" which can be granulated into a fine powder after holding. Further information concerning the "add-back" process and other suitable processes for the formation of potato granules may be found in the above-mentioned publication on "Potato Processing" by Talburt and Smith.

The dust-coated potato strips according to the present invention will have a layer of potato granules sufficient to cover the potato strips and provide a coherent coating. Preferably, the potato strips will have a coating which comprises from about 0.3 to about 1.5 percent or as much as 5 percent by weight of the potato strip. In preferred embodiments, the dust-coating comprises from about 0.6 to about 0.8 percent by weight of the potato strip.

The potato strips are then finish fried. Although the potato strips may be finish fried while still frozen, it is preferable to allow the potato strips to thaw overnight before frying, i.e. for about 8 to about 18 hours at about 30°–45° F., and most preferably for 12–16 hours at 32°–38° F. until an internal temperature of 31°–32° F. is attained. It is preferred that the finish frying step occur promptly after dust-coating.

The frying medium is preferably a vegetable shortening or fat, although beef tallow, a blend of beef tallow and one or more vegetable oils, etc. can also be used. In preferred embodiments of the present invention, however, the frying medium is a vegetable fat which mimics the physical properties, taste and mouth-feel of beef tallow. A partially hydrogenated vegetable oil with melting and mouthfeel characteristics which approximate those of beef tallow, and has a Wiley melting point of from about 95° to about 99° F., a solid fat index at 50° F. of from about 34 to about 43 and a solid fat index at 92° F. of from about 3 to about 8 is most preferred. An example of a commercially available product having such characteristics is Durkee's Durkex TM Code #321.

The temperature of the frying medium before the potato strips are added is approximately 370° F. This temperature is depressed (to approximately 340° F.) when the potato strips are added and then rises to about 360° F. during the course of frying. The potato strips are preferably fried in this medium from about 3 to about 4 minutes. In a continuous process, a temperature of the frying medium of from about 345° to about 360° F. would be suitable. The frying temperature and time are inversely proportional and are adjusted to cook the potato strips in a short period of time to provide a product having a crisp exterior and a tender interior.

Frying the potato strips in this manner provides a product which includes a reduced water content at from about 20 to about 36 percent by weight and an increased fat content of from about 16 to about 30 percent by weight, which is thought to compensate for the lower water content. The potato solids content of the finish fried potato strips is from about 34 to about 64 percent by weight of the potato strips. The density of the finish fried potato strip is from about 0.4–0.6 g/ml, and preferably from about 0.43 to about 0.49 g/ml.

If the potato strips are to be reconstituted by deep fat frying rather than by microwaving, the temperature of the frying medium before the potato strips are added is approximately 348°–355° F. and the potato strips fried for about 3–4 minutes, most preferably from about 190–205 seconds. On the other hand, if the finish frying is carried out in a continuous fryer (in which the temperature from one end to the other is different), the temperature of the frying medium before the potato strips are added is from about 340° to about 375° F. The frying time in the continuous frying process is from about 150 to about 225 seconds, and the output is about 18 lbs/hour.

The finish fried potato strips which are to be reheated by a short deep fat frying have a moisture content from about 34 to about 42 percent, a fat content from about 15 to about 21 percent, and a potato solids content from about 37 to about 64 percent by weight of the potato strip.

The finish frying of the potato strips therefore operates to lock in significantly less moisture and more fat than that which is taught in the prior art. The long frying time also operates to generate and lock in more aroma and flavor than otherwise possible.

After finish frying, finely ground salt is optionally sprinkled onto the surface of the potato strips in an amount sufficient to provide an acceptable taste. An amount of salt from about 0.5 to about 1.5 percent by weight would be suitable.

Then the potato strips are frozen. In contrast to the conventional freezing methods which are utilized in the prior art whereby cold air from freon coils, etc. is blown directly onto the potato strips by a fan resulting in significant (e.g. 10%) surface desiccation and dehydration, in the present invention the potato strips preferably are frozen in a manner which substantially avoids desiccation and thus structural damage.

In a preferred embodiment, the finish fried potato strips are promptly frozen. By "promptly frozen", it is meant that the finish fried potato strips are drained of excess oil and allowed to cool to a temperature of from about 100° to about 250° F., and preferably 150°–200° F. before freezing. In most circumstances, the cooling period will be from about 1 to about 3 minutes in order to reach the aforementioned temperatures. For instance, the potato strips are carefully frozen at a temperature of about −30° to about −70° F. for about 10 to about 20 minutes, until the internal temperature of the potato strips is about −10° F. Prompt freezing in this manner preserves the flavor and aroma present in the finish fried potato strips, and also preserves the structural integrity of the same. Slow cooling appears to cause a significantly greater percentage of the potato strips to have a collapsed structure upon reheating.

In another preferred embodiment, the potato strips are frozen in a tunnel cooled by liquid nitrogen to about −30° to −40° F. for about 20 minutes without direct exposure to a fan. The liquid nitrogen comes out of a tank and into a freezing tunnel and is circulated in the vapor form. The potato strips pass through the freezing tunnel on a belt. It is especially preferred that the starting temperature to which the potato strips are exposed in the freezing tunnel is at least about −50° to about −60° F., the temperature gradually increasing as the potato strips pass through the tunnel until the temperature at the opposite end of the tunnel is about −10° to −15° F. (equal to the desired internal temperature of the potato strips at the end of the freezing process). In this embodiment, the freezing process is conducted for about 15 minutes. It is important to note that a freezing blast is not directly applied to the potato strips; rather, there is a gentle flow over the potato strips so as not to cause unnecessary dehydration and also so as not to damage the surface.

The freezing of the potato strips in this manner produces a frozen product without any substantial desiccation and without freezer burn, the ice crystals which are formed during the freezing process are as small as possible so as to cause minimal structural damage. If a direct freezing blast is applied, or if the strips are frozen at a lower temperature (colder than approx. −70° F.), a leathery skin develops.

Alternatively, any other manner known in the art to accomplish a continuous, gradual freezing of the potato strips to the above-mentioned temperatures without the formation of large ice crystals and without significant structural damage to the potato strips may be used.

The frozen potato strips are then packed into tightly sealed, i.e. airtight, packages and stored at normal freezer temperatures of approximately 0° to about −20° F. The containers may contain a large amount of the potato strips, i.e. a few pounds, or may be designed to hold a suitable serving size.

Thereafter, a desired portion, i.e. about 70 grams (2.5 ounces) for a typical single serving of the frozen potato strips may be removed from the freezer and placed on any suitable platter for use in microwave ovens, such as paper plates, or microwave-safe dishes, microwaveable packaging etc., and placed in a conventional microwave oven. The potato strips are then reheated with an effective amount of microwave energy. Usually, the microwaved product has an internal temperature of from about 150° to about 160° F. If the microwave oven is one which is conventionally available to consumers for home use, the potato strips are reheated at high power (e.g. 600–700 watts) for approximately one minute. The reheating time of course is dependent upon the oven wattage used and the amount of potato strips to be reheated. Thus, if a larger quantity, i.e. multiple servings, of potato strips are reheated in the microwave oven, or if a power of 600–700 watts is not achieved, a longer microwave period may be necessary.

Alternatively, if the microwave oven is one which is conventionally used in a fast-food restaurant or a convenience store, the microwave power setting may be set at approximately 1000–1400 watts. The time period for reheating the potato strips is shortened accordingly, i.e. approximately 40 seconds at 1000 watts.

Since the potato strips preferably have been fully cooked during the finish frying, the microwaving is adjusted to reconstitute the strip (substantially only heating) to its condition immediately after finish frying.

The microwaved potato strips may be eaten immediately upon their removal from the microwave oven. The microwaved potato strips, on the other hand, may be allowed to cool for about 30 seconds. The product is then on the average from about 130° to about 140° F. and ready to serve. The potato strips are crisp on the outside, tender on the inside, golden in color, and closely resemble the flavor, aroma, texture and total eating experience of the McDonald's ™ french fry.

The composition of the microwaved and ready to serve french fried potato products of the present invention include from about 20 to about 36 percent moisture, from about 16 to about 30 percent fat, and from about 47 to about 63 percent potato solids.

The potato strips can also be reheated by deep fat frying for a short period of time. Suitable conditions are, for example, frying the potato strips for about 20 seconds in a frying medium having a starting temperature of about 360° F. before the introduction of the potato strips. Once again, the reheating time is dependent upon the temperature of the medium, which in turn can be influenced by the number of strips being reheated at a particular time. The deep fat fried product may be eaten immediately or allowed to cool for about 30 seconds or more.

As previously mentioned, if the potato strips are to be reheated by deep fat frying, it is preferred that they include a slighter higher moisture content than those which are to be reheated in a microwave oven. This is because the potato strips lose more moisture in the deep fat fryer.

The composition of the french fried potato products after reheating in a deep fat fryer includes from about 30 to about 37 percent moisture, from about 18 to about 26 percent fat, and from about 37 to about 52 percent potato solids by weight of the potato strip.

In an alternative embodiment of the present invention, the final freezing step (after finish frying) may be omitted if shipping and/or storage is not necessary. In this embodiment, the potato strips are allowed to cool at room temperature or are refrigerated after finish frying and thereafter a serving portion is simply placed in a microwave oven or deep fat fryer and reheated as detailed above when desired. After reheating, the product has characteristics which were described above.

One possible explanation for the exceptional product which is obtained in accordance with the present invention is that the dust-coating of the potato strip forms (or assists in forming) a thin, crisp coat during the finish frying. This coat initially inhibits steam which is produced by heating the moisture present in the interior of the potato strip from escaping during finish frying, and causes a slight puffing of the potato strip. An "invisible" gap is thus formed between the coating and the interior of the product, the coating being held together with the interior via a loose binding. This gap accommodates the small ice crystals which form during the freezing of the product without causing structural or cellular damage. In turn, there is no substantial loss of cellular integrity in the microwaved product which would cause a "collapsing" and/or a limp, soggy product. This hypothesis is not meant to limit the scope of the present invention, but rather is advanced only as a possible explanation for the product which is produced.

DETAILED DESCRIPTION OF THE PARTICULAR EMBODIMENTS

The following examples illustrate various aspects of the present invention. They are not intended to limit the claims.

EXAMPLES 1 and 2

Conventional frozen potato strips made available to fast food restaurants are obtained and divided into two portions for subsequent processing. One skilled in the art will appreciate that such conventional frozen potato strips are derived from whole potatoes which have been peeled, cut, blanched, possibly treated with one or more of the chemicals discussed previously, and either water or steam blanched. These potato strips are thereafter parfried for approximately 30–60 seconds at about 375° F. and frozen.

One portion of the above-mentioned potato strips representing Example 1 is then further processed. First, the frozen potato strips are allowed to temper overnight, i.e. at about 40° F. from about 8 to about 18 hours. The thawed potato strips are then dust-coated with potato granules (U.S. 40 mesh/ground potato). The dust-coating of the potato granules comprises about 0.7 percent by weight of the potato strip. The dust-coated potato strips are promptly placed into a fryer. The frying medium used is Durkee's Durkex TM code #321. The temperature of the frying medium before the potato strips are added is approximately 370° F. This temperature is depressed when the potato strips are added, and increases during the frying time. The temperature range of the frying medium during frying is from about 340° to about 370° F. The potato strips are fried for about 3.5 minutes. Thereafter, the potato strips are removed from the fryer and the oil is allowed to drain from their surface. The potato strips are allowed to cool (for about 1.5 minutes) to about 200° F. and then are promptly frozen by placing them on a belt which passes through a tunnel cooled by an indirect flow of liquid nitrogen to about −30° to about −40° F. for about 20 minutes (without direct exposure to a fan). The internal temperature of the potato strips after freezing is about −10° F.

Example 2 is prepared in an identical manner except that the dust-coating step is omitted. The frozen potato strips of Example 1 and 2 were separately packed in airtight packages and stored at freezer temperatures (approximately 0° to −10° F.).

A 70 gram sample of each of two portions was then removed from the freezer after 24 hours and separately reheated in a conventional microwave oven (700 watts) at a power setting of high for one minute. The microwaved portions were then allowed to cool for approximately 30 seconds, at which time they were ready-to-serve. The french fried potato product of Example 1 had a crisp, golden exterior and a fluffy, light interior. The french fried potato product also had an aroma, flavor, mouthfeel and total eating experience closely resembling that attained by the conventional state of the art commercially available deep fat fried fast-food product, i.e. McDonald's TM french fries. Example 2 was virtually identical in all of the aforementioned properties. Because the potato strips puffed slightly during microwaving, the 70 gram or 2.5 ounce serving appeared as large as an 85 gram or 3 ounce serving of french fries obtained from a fast-food restaurant.

After the potato strips of Examples 1 and 2 had been stored for 6 days at freezer temperatures, another 70 gram portion of each was removed from the freezer and separately reheated in a conventional microwave oven as detailed above. The french fried potato product of Example 1 was virtually identical to that which was prepared after 24 hours of freezing. However, there was a noticeable difference in the french fried product of Example 2. Example 2 was perceptively less crisp and limper than that produced by the french fried product of Example 1.

EXAMPLE 3

Example 3 was prepared in an identical manner as Example 1 except that the parfried and frozen potato strips obtained from a commercial source are not thawed, but instead are coated while still frozen and then fried. The finish fried potato strips were puffier and consequently more rounded than those obtained in Examples 1 and 2. After microwaving as detailed above, the french fried potato product of Example 3 also had typical french fry sensory attributes, but a greater amount of the interior has collapsed, from a loss of cellular integrity in those areas. This is probably due to the explosive sublimation of internal ice into water vapor when the frozen product was placed in 370° F. oil. Overall, however, the product of Example 3 represented a vast improvement over the prior art microwaved french fry.

EXAMPLES 4–7

A comparison was made between french fried potato products made in accordance with the present invention which have been finish fried for varying amounts of time.

Parfried and frozen potato strips obtained from a commercial source are dust-coated as detailed in Example 1 and then separated into three portions corresponding to Examples 4,5 and 7. Example 6 was prepared in an identical manner, except that the parfried frozen potato strip came from a different commercial supplier. Example 4 was then prepared by finish frying for 3 minutes. Examples 5 and 6 were both finish fried for 3.5 minutes. Finally, Example 7 was finish fried for 4 minutes.

Table I provides the percentages of moisture, fat and potato solids for Examples 4–7.

TABLE I
COMPOSITIONS AFTER FINISH FRYING

| Example | Frying time | % H$_2$O | % Oil | % Potato Solids |
|---|---|---|---|---|
| 4 | 3 min. | 32.1 | 20.6 | 47.3 |
| 5 | 3.5 min. | 28 | 23.8 | 48.2 |
| 6 | 3.5 min. | 29.5 | 25.9 | 44.6 |
| 7 | 4 min. | 21.4 | 28.7 | 49.9 |

EXAMPLE 8

The finish fried potato strips of Example 5 were frozen and stored as set forth in Example 1. Thereafter, 70 grams of the frozen potato strips were reheated for 1 minute in a 700 watt microwave oven at a power setting of high. The composition of the potato strips was analyzed after reheating and compared to the composition of the potato strips at earlier stages of the process. The results are provided in Table II.

Next, analysis was performed on certain commercially available products to determine their compositions before and after final preparation. Namely, comparative Example A sets forth the results of analysis of the McDonald's TM french fry, both at the frozen state (this product being equivalent to the parfried and frozen potato strips used in Example 1) and after finish frying in beef tallow. Comparative Example B sets forth the results of analysis performed on microwavable crinkle cut french fries commercially available from Ore-Ida Foods, Inc. before and after final cooking in a microwave oven in accordance with the instructions provided on the box. Comparative Example C sets forth the results of analysis performed on another brand of microwavable crinkle cut french fries, Micromagic TM, commercially available from J. R. Simplot Co., before and after final cooking in a microwave according to the directions provided on the box. Finally, Comparative Examples D, E, F and G represent data which was set forth in the prior art. More particularly, Comparative Example D sets forth information obtained from U.S. Pat. No. 4,317,842 (El-Hag et al.), Table I, Example I; Comparative Example E provides information obtained from U.S. Pat. No. 4,456,624 (Glantz et al.), Example I; and Comparative Example F provides information set forth in U.S. Pat. No. 4,632,838 (Doenges), Example II.

The compositions of these products before final preparation, or reheating in the case of the present invention, are set forth in Table III, whereas the compositions of the ready-to-serve products are set forth in Table IV.

TABLE II
COMPOSITION OF EXAMPLE 5 AT VARIOUS STEPS OF THE PROCESS

| PROCESS STEP | % H$_2$O | % Oil | % Potato Solids |
|---|---|---|---|
| Parfried and frozen potato strips | 63 | 7.2 | 29.8 |
| Potato strips after Dust-Coating | 62.5 | 7.0 | 30.5 (0.7 = dust-coating) |
| Potato strips after finish frying for 3.5 minutes | 28 | 23.8 | 48.2 |
| Potato strips after microwaving for 1 minute | 26.4 | 22.8 | 50.8 |

TABLE III
COMPOSITIONS

| Example | | % H$_2$O | % Oil | % Potato Solids |
|---|---|---|---|---|
| 5[3] | | 28.0 | 23.8 | 48.2 |
| 6[3] | | 29.5 | 25.9 | 44.6 |
| A | (McDonald's TM)[1] | 63 | 7.2 | 29.8 |
| B | (Ore-Ida)[3] | 61.4 | 7.5 | 31.1 |
| C | (J. R. Simplot)[3] | 48.9 | 11.3 | 39.8 |
| D | (El-Hag et al. '842)[2] | 47.0 | 15.0 | 38.0 |
| E | (Glantz '624)[1] | 64.6 | 7.2 | 28.2 |
| F | (Doenges '838)[1] | 68.4 | 5.8 | 25.8 |

[1]Before finish frying
[2]Before oven baking
[3]Before microwaving

TABLE IV
COMPOSITIONS

| Example | | % H$_2$O | % Oil | % Potato Solids |
|---|---|---|---|---|
| 5 | | 26.4 | 22.8 | 50.8 |
| A | (McDonald's TM)[1] | 37.5 | 19.3 | 43.2 |
| B | (Ore-Ida)[2] | 53 | 9.1 | 37.9 |
| C | (Micromagic TM)[3] | 46.2 | 10 | 43.8 |
| D | (El-Hag et al. '842)[4] | 33 | 17 | 50 |
| E | (Glantz '624)[5] | 45.3 | 12.8 | 41.9 |
| F | (Doenges '838)[6] | 44 | 15.8 | 40.2 |

[1]After finish frying in beef tallow for 1.5–3.5 minutes at 300–375° F.
[2]After microwaving for 3.5 minutes at 700 watts
[3]After microwaving for 2 minutes at 700 watts
[4]Prepared by oven-heating using a heat transferring apparatus which optimizes convection
[5]After frying in oil at 350° F. for 2.5 minutes
[6]After finish frying in oil for 2.5 minutes at 330–370° F.

As is readily apparent when considering the composition of the present invention as compared to that which is known in the art, the composition of the present invention provides a significant reduction in moisture content and a significant increase in fat content both before and after microwaving.

EXAMPLES 9–12

Whole raw potatoes are washed, peeled, cut into shoestring potato strips, and blanched in water at 165° F. for 15 minutes. Thereafter, the resultant potato strips were dust-coated in the manner set forth in Example 1 and the potato strips separated into four portions. The product of Example 9 was then parfried in a medium comprised of Durkee's Durtex TM Code #321 for 1 minute. The product of Example 10 was parfried for 2 minutes and the product of Example 11 was parfried for 3 minutes in the same medium. Thereafter, the potato strips were drained from excess oil and allowed to cool to about 100° F. The potato strips of Examples 9–11 were then finish fried in the same medium such that each of the Examples underwent a total frying time in oil of about 4 minutes. In other words, the potato strips of Example 9 were finish fried for 3 minutes; the potato strips of Example 10 were finish fried for 2 minutes; and the potato strips of Example 11 was finish fried for 1 minute. In Example 12, the parfrying step was omitted and the potato strips were finish fried for about 4 minutes.

The potato strips of Examples 9-12 were then promptly frozen in the same manner as set forth in Example 1 and then stored at −20° F. for approximately 15 hours. Thereafter, 70 gram samples of each were reheated in a 700 watt microwave oven at a power setting of high for 1 minute.

Each of the microwaved french fried potato products of Examples 9-12 were crisp, golden in color, and had the aroma, flavor, texture and mouth feel of a McDonald's french fry. However, even though each of the above-mentioned products were highly palatable, the french fried potato products of Example 9, which underwent the shortest parfry and longest finish fry, was determined to be the most palatable, and accordingly the most preferred product. Also, the french fried potato products which underwent both a parfrying and finish frying step (Examples 9-11) were preferred to those which underwent only a single frying (Example 12).

EXAMPLE 13

The average density of potato strips prepared according to Example 1 and Example 2 were analyzed with regard to density after parfrying and freezing; after finish frying and freezing; and after microwave reheating. The results are provided in Table V. In addition, the average densities of McDonald's ™ french fries and the Ore-Ida microwave french fries, corresponding to Comparative Examples A and B, respectively, were determined before and after final preparation. The results are set forth in Table VI.

TABLE V

| Example 1 | DENSITY Average Density (g/ml) |
|---|---|
| parfried and frozen | 0.73 |
| finish fried and frozen | 0.46 |
| microwaved | 0.46 |

TABLE VI

| EXAMPLE | | Density (g/ml) Before Final Preparation Step | Density (g/ml) After Final Preparation Step |
|---|---|---|---|
| 1 | | 0.46 | 0.46 |
| 2 | | 0.53 | 0.53 |
| A | (McDonald's ™) | 0.73 | 0.61 |
| B | (Ore-Ida) | 0.79 | 0.75 |

The density data set forth above indicates that the french fried potato products prepared according to the present invention are substantially lighter and fluffier than commercially available prior art french fries. One possible explanation for the low density of the french fried potato products of the present invention is that the same may be a result of the dust-coating which provided a puffed up interior during finish frying.

EXAMPLES 14 and 15

Conventional frozen potato strips made available to fast food restaurants are treated in accordance with Example 1, except that the potato strips are finish fried for about 205 seconds in Durkex ™ code 321 at a starting temperature of about 348°-355° F. The finish fried potato strips are frozen as in Example 1. However, rather than reheating in a microwave oven, the frozen potato strips are reheated in a bench top twin well batch fryer (Pitco Mini Mastermagic) for about 20 seconds. The frying medium (Durkex ™ code 321) has a starting temperature (before the potato strips are added) of about 360° F. The french fried product of Example 14 had an aroma, flavor, mouthfeel, and total eating experience closely resembling that attained by the conventional state of the art product.

Example 15 was prepared in an identical manner as Example 14, except that the dust-coating step is omitted. The french fried product of Example 15 also had an aroma, flavor, mouthfeel and total eating experience closely resembling that attained by the conventional state of the art product.

Table VII provides the percentages of moisture, fat and potato solids of Example 14 after parfrying and freezing, finish frying, and reheating. Table VIII provides similar data for Example 15.

TABLE VII

COMPOSITION OF EXAMPLE 14 AT VARIOUS STEPS OF THE PROCESS

| PROCESS STEP | % $H_2O$ | % Oil | % Potato Solids |
|---|---|---|---|
| Parfried and frozen potato strips | 63 | 7.2 | 29.8 |
| Potato strips after finish frying for 205 seconds | 37.1 | 17.3 | 45.6 |
| Potato strips after reheating by deep fat frying for 20 seconds at 360° F. | 33.6 | 23.7 | 42.7 |

TABLE VIII

COMPOSITION OF EXAMPLE 15 AT VARIOUS STEPS OF THE PROCESS

| PROCESS STEP | % $H_2O$ | % Oil | % Potato Solids |
|---|---|---|---|
| Parfried and frozen potato strips | 63 | 7.2 | 29.8 |
| Potato strips after finish frying for 205 seconds | 36.5 | 17.8 | 45.7 |
| Potato strips after reheating by deep fat frying for 20 seconds at 360° F. | 33.2 | 23.9 | 42.9 |

The examples provided above are not meant to be exclusive. Many other variations of the present invention would be obvious to those skilled in the art, and are contemplated to be within the scope of the appended claims.

We claim:

1. A process for preparing french fried potatoes suitable for subsequent reheating in a deep fat fryer to obtain a product having a crisp exterior and a tender interior, comprising blanching potato strips, dust-coating said blanched potato strips with potato granules to provide a thin coating of said potato granules on said potato strips, finish frying said dust-coated potato strips until said potato strips have a moisture content from about 34 to about 42 percent, and reheating said finish fried potato strips in a deep fat fryer until said potato strips have a moisture content from about 30 to about 37 percent by weight of said potato strips.

2. The process according to claim 1, wherein said potato strips are reheated until they have a crisp exterior and a tender interior.

3. The process according to claim 1, wherein said finish fried potato strips are reheated in fat or oil heated to a temperature of about 360° F. when said potato strips are introduced therein until said potato strips are palatable.

4. The process according to claim 3, wherein said reheating is carried out for about 20 seconds.

5. The process according to claim 1, wherein said potato strips are reheated until they have a fat content from about 18 to about 26 percent.

6. The process according to claim 1, wherein said dust-coated potato strips are finish fried for about 3 to about 4 minutes in fat or oil heated to a temperature from about 348° to about 355° F. when said potato strips are introduced therein.

7. The process according to claim 6, wherein said finish frying is carried out for about 190 to about 205 seconds.

8. The process according to claim 1, wherein said potato strips are finish fried in a continuous fryer for about 150 to about 225 seconds in fat or oil at a temperature from about 340° to about 375° F. when said potato strips are introduced therein.

9. The process according to claim 1, further comprising parfrying said potato strips prior to dust-coating.

10. The process according to claim 9, wherein said parfrying is conducted at about 375° F. for about 30 to about 60 seconds.

11. The process according to claim 9, further comprising freezing said parfried potato strips prior to dust-coating.

12. The process according to claim 11, wherein said freezing is conducted by blast freezing at from about −25° to about −30° F.

13. The process according to claim 11, further comprising thawing said frozen potato strips for about 8 to about 18 hours at a temperature of about 45° F. prior to dust-coating.

14. The process according to claims 1, 9 or 11, wherein said potato strips are shoestring potatoes.

15. The process according to claims 1 or 9, further comprising freezing said finish fried potato strips substantially without desiccation.

16. The process according to claim 9, further comprising freezing said finish fried potato strips until said potato strips have an internal temperature of about −10° F.

17. The process according to claim 16, wherein said freezing is conducted in a tunnel cooled by liquid nitrogen vapor at a temperature of about −30° to about −40° F. for about 10 to about 20 minutes.

18. The process according to claim 16, wherein said freezing is accomplished by passing said potato strips through a tunnel cooled by a gentle flow of liquid nitrogen vapor without direct exposure to a fan at a starting temperature of about −50° to about −60° F. and gradually increasing the temperature of the tunnel to about −10° to about −15° F.

19. The process according to claim 18, wherein said freezing is conducted for about 10 to about 20 minutes.

20. The process according to claim 16, further comprising cooling said finish fried potato strips to a temperature of about 100° to about 250° F. before freezing.

21. The process according to claim 16, wherein said freezing is conducted promptly after said finish frying.

22. The process according to claim 16, wherein said freezing is conducted in a manner such that small ice crystals are formed in said potato strips.

23. The process according to claim 16, further comprising storing said frozen potato strips in a tightly sealed container at about 0° to about −20° F.

24. The process according to claim 1, wherein said dust-coated potato strips are fried in vegetable fat or oil.

25. The process according to claim 24, wherein said vegetable fat or oil which has similar physical properties, mouthfeel and taste to beef tallow.

26. The process according to claim 1, wherein said potato strips are finish fried until they have a fat content of from about 15 to about 21 percent by weight.

27. The process according to claim 1, wherein said dust-coating comprises applying a thin coat of fine potato granules to said potato strips.

28. The process of claim 27, wherein said coating of potato granules comprises from about 0.3 to about 1.5 percent by weight of said dust-coated potato strips.

29. The process of claim 27, wherein said dust-coating comprises U.S. 40 mesh potato granules having a moisture content of not more than 8 percent.

30. The process according to claim 1, wherein said reheating is conducted until said frozen potato strips reach an average internal temperature from about 150° to about 160° F.

31. The process according to claim 1, wherein said potato strips are finish fried until they have a moisture content from about 36 to about 38 percent and a fat content from about 16 to about 18 percent.

32. The process according to claim 1, wherein said potato strips are reheated until they have a moisture content of 32 to about 35 percent and said fat content is from about 23 to about 25 percent after reheating in a deep fat fryer.

33. A process for preparing french fried potatoes, comprising blanching potato strips, parfrying said blanched potato strips, freezing said parified potato strips, thawing said frozen potato strips, thereafter dust-coating said potato strips with a thin coating of fine potato granules, finish frying said potato strips until said potato strips have a moisture content from about 34 to about 42 percent, cooling said finish fried potato strips to a temperature of about 100° F. to about 250° F., promptly freezing said cooled potato strips in a tunnel cooled by a gentle flow of liquid nitrogen vapor, the temperature of the liquid nitrogen vapor to which said potato strips are exposed gradually increasing as the potato strips pass through said tunnel from a starting temperature of about −50° F. to about −60° F. to an ending temperature of about −10° F. to about −15° F., and reheating said frozen finish fried potato strips in a deep fat fryer until said potato strips have a moisture content from about 30 to about 37 percent by weight of said potato strips.

34. The process according to claim 33, wherein said finish fried and frozen potato strips are reheated until said potato strips reach an internal temperature from about 150° to about 160° F.

35. The process according to claim 34, wherein said potato strips are reheated for about 20 seconds.

36. The process according to claim 33, wherein said finish fried potato strips have a moisture content from about 36 to about 38 percent and a fat content from about 16 to about 18 percent.

37. The process according to claim 36, wherein said reheated potato strips have a moisture content from about 32 to about 35 percent and a fat content from about 23 to about 25 percent.

38. The process according to claim 33, wherein said potato strips are thawed at a temperature of about 45° F. for about 8 to about 18 hours prior to finish frying.

39. The process according to claim 33, wherein said potato strips are thawed for about 8 to about 18 hours at a temperature of about 45° F.

40. The process according to claim 33, wherein said potato strips are finish fried for about 3 to about 4 minutes in fat or oil heated to a temperature from about 348° to about 355° F. when said potato strips are introduced therein.

41. The process according to claim 33, wherein said potato strips are finish fried in a continuous fryer for about 150 to about 225 seconds in fat or oil at a temperature from about 340° to about 375° F. when said potato strips are introduced therein.

42. The process according to claim 33, wherein said reheating is carried out by frying said potato strip for about 20 seconds in fat or oil heated to a temperature of about 360° F. when said potato strips are introduced therein.

43. A process for preparing french fried potatoes, comprising
blanching potato strips,
parfrying said blanched potato strips,
freezing said parfried potato strips,
thawing said frozen potato strips, thereafter
dust-coating said potato strips with a thin layer of fine potato granules,
finish frying said potato strips until said potato strips have a moisture content from about 34 to about 42 percent, cooling said finish fried potato strips to a temperature of about 100° F. to about 250° F.,
promptly freezing said cooled potato strips at a temperature of about −30° F. to about −70° F. for about 10 to about 20 minutes until the internal temperature of the potato strips is about −10° F., and
reheating said frozen finish fried potato strips in a deep fat fryer until said potato strips have a moisture content from about 30 to about 37 percent by weight of said potato strips.

* * * * *